US011072551B2

(12) United States Patent
Zhang et al.

(10) Patent No.: US 11,072,551 B2
(45) Date of Patent: Jul. 27, 2021

(54) WATER FILTRATION SYSTEM WITH RECIRCULATION TO REDUCE TOTAL DISSOLVED SOLIDS CREEP EFFECT

(71) Applicant: A. O. SMITH CORPORATION, Milwaukee, WI (US)

(72) Inventors: Hai-Feng Zhang, Winchester, MA (US); David J. Averbeck, Dousman, WI (US); Zhaoshan Cheng, Nanjing (CN)

(73) Assignee: A. O. SMITH CORPORATION, Milwaukee, WI (US)

( * ) Notice: Subject to any disclaimer, the term of this patent is extended or adjusted under 35 U.S.C. 154(b) by 532 days.

(21) Appl. No.: 15/839,612

(22) Filed: Dec. 12, 2017

(65) Prior Publication Data
US 2018/0162761 A1    Jun. 14, 2018

Related U.S. Application Data

(60) Provisional application No. 62/433,209, filed on Dec. 12, 2016.

(51) Int. Cl.
*B01D 61/02* (2006.01)
*B01D 61/12* (2006.01)
(Continued)

(52) U.S. Cl.
CPC .......... *C02F 9/005* (2013.01); *B01D 61/025* (2013.01); *B01D 61/027* (2013.01); *B01D 61/12* (2013.01);
(Continued)

(58) Field of Classification Search
CPC ........ B01D 29/00; B01D 29/01; B01D 29/05; B01D 37/04; B01D 61/00; B01D 61/002;
(Continued)

(56) References Cited

U.S. PATENT DOCUMENTS 4,629,568 A    12/1986  Ellis, III
5,281,253 A *  1/1994  Thompson ........... B01D 53/226
                                         95/22
(Continued)

FOREIGN PATENT DOCUMENTS

CN    1530331 A    9/2004
CN    201458852 U  5/2010
(Continued)

OTHER PUBLICATIONS

McDonald et al., "Reduce Reverse Osmosis Membrane Fouling with Good CIP Procedures," Ultrapure Water, 2004, 21(3):46-52.
(Continued)

*Primary Examiner* — Joseph W Drodge
(74) *Attorney, Agent, or Firm* — Michael Best & Friedrich LLP

(57) ABSTRACT

A point-of-use water filtration system having an idle mode and a filtration mode, the water filtration system including a feed water inlet, a pump in fluid communication with the feed water inlet via a feed water line, and a semi-permeable membrane having an upstream side and a downstream side. A first portion of the upstream side is in fluid communication with a membrane inlet and a second portion of the upstream side is in fluid communication with the concentrate outlet, and the downstream side is in fluid communication with a permeate outlet. The point-of-use water filtration system also includes a permeate line in fluid communication with the permeate outlet and a filtered water outlet, a concentrate line in fluid communication with the concentrate outlet, a flow path configured to selectively connect the permeate line to the feed water line; and a controller configured to anticipate demand for the filtration mode based on operator habit information stored in a memory of the controller when the water filtration system is in the idle mode and to recirculate water in the permeate line through the pump and the
(Continued)

semi-permeable membrane in response to the anticipated demand for the filtration mode.

9 Claims, 5 Drawing Sheets

(51) Int. Cl.
| | | |
|---|---|---|
| C02F 1/00 | (2006.01) | |
| C02F 1/44 | (2006.01) | |
| C02F 1/32 | (2006.01) | |
| C02F 1/78 | (2006.01) | |
| C02F 1/28 | (2006.01) | |
| C02F 9/00 | (2006.01) | |
| C02F 1/50 | (2006.01) | |

(52) U.S. Cl.
CPC .......... *C02F 1/008* (2013.01); *B01D 2311/25* (2013.01); *B01D 2313/08* (2013.01); *C02F 1/283* (2013.01); *C02F 1/32* (2013.01); *C02F 1/325* (2013.01); *C02F 1/441* (2013.01); *C02F 1/442* (2013.01); *C02F 1/505* (2013.01); *C02F 1/78* (2013.01); *C02F 2201/005* (2013.01); *C02F 2209/005* (2013.01); *C02F 2209/40* (2013.01); *C02F 2301/046* (2013.01); *C02F 2303/04* (2013.01); *C02F 2307/10* (2013.01)

(58) Field of Classification Search
CPC .... B01D 61/02; B01D 61/022; B01D 61/025; B01D 61/027; B01D 61/08; B01D 61/12; B01D 61/14; B01D 61/145; B01D 61/147; B01D 61/18; B01D 61/22; B01D 61/58; B01D 63/00; B01D 2311/00; B01D 2311/22; B01D 2311/25; B01D 2315/18; B01D 2315/20; B01D 37/00; B01D 2311/06; B01D 2311/26; B01D 2315/00; B01D 2311/243; B01D 2313/08; B01D 2313/18; C02F 1/00; C02F 1/001; C02F 1/008; C02F 1/32; C02F 1/325; C02F 1/505; C02F 1/78; C02F 1/44; C02F 1/441; C02F 1/442; C02F 1/444; C02F 1/445; C02F 2209/00; C02F 2209/001; C02F 2209/003; C02F 2209/005; C02F 9/005; C02F 1/991; C02F 2209/006; C02F 2209/44; C02F 2301/00; C02F 2301/06; C02F 2307/00; C02F 2307/08; C02F 2307/10; C02F 2307/12; C02F 1/283; C02F 2103/02; C02F 2201/005; C02F 2209/008; C02F 2209/05; C02F 2209/40; C02F 2301/046; C02F 2303/04; B67D 7/76; B67D 7/766
USPC ........... 210/767, 790, 138, 141, 143, 321.6, 210/321.72, 348, 500.1, 500.21, 650, 805, 210/85, 97, 102, 103, 418, 96.2, 194, 210/195.2, 196, 652, 739; 222/23, 52, 222/638, 639; 700/231, 240, 273, 282
See application file for complete search history.

(56) References Cited

U.S. PATENT DOCUMENTS

| | | | |
|---|---|---|---|
| 5,282,972 A | 2/1994 | Hanna et al. | |
| 5,505,841 A | 4/1996 | Pirbazari et al. | |
| 5,520,816 A | 5/1996 | Kuepper | |
| 6,001,244 A | 12/1999 | Salter et al. | |
| 6,190,558 B1* | 2/2001 | Robbins | B01D 61/025 210/134 |
| 6,325,093 B1* | 12/2001 | Ooshima | G05D 7/0682 137/392 |
| 7,316,774 B2 | 1/2008 | Halemba et al. | |
| 7,402,240 B2 | 7/2008 | Kung et al. | |
| 8,206,581 B2 | 6/2012 | Richetti | |
| 10,287,201 B2* | 5/2019 | Heimel | B01D 61/58 |
| 2003/0015470 A1 | 1/2003 | Muralidhara et al. | |
| 2005/0103717 A1 | 5/2005 | Jha et al. | |
| 2007/0163628 A1* | 7/2007 | Zimmer | B01D 61/142 134/134 |
| 2007/0295650 A1* | 12/2007 | Yoneda | B01D 61/025 210/97 |
| 2008/0179250 A1 | 7/2008 | Muralidhara et al. | |
| 2009/0194478 A1 | 8/2009 | Saveliev et al. | |
| 2010/0140095 A1 | 6/2010 | Telepciak et al. | |
| 2012/0103906 A1* | 5/2012 | Efraty | B01D 61/022 210/652 |
| 2012/0205307 A1* | 8/2012 | Boudinar | C02F 1/44 210/636 |
| 2013/0066475 A1* | 3/2013 | Yokokawa | C02F 1/008 700/281 |
| 2013/0248450 A1* | 9/2013 | Kenley | A61M 1/3633 210/650 |
| 2014/0061129 A1* | 3/2014 | Hoz | C02F 1/441 210/636 |
| 2014/0181553 A1 | 6/2014 | Eckert et al. | |
| 2014/0251905 A1 | 9/2014 | Schneidewend | |
| 2016/0002071 A1* | 1/2016 | Tokunaga | B01D 61/12 210/652 |
| 2016/0016836 A1* | 1/2016 | Sudnick | C02F 9/00 210/104 |
| 2017/0334747 A1* | 11/2017 | Cohen | C02F 1/44 |
| 2019/0241446 A1* | 8/2019 | Eliosov | B01D 61/22 |

FOREIGN PATENT DOCUMENTS

| | | |
|---|---|---|
| CN | 203212390 U | 9/2013 |
| CN | 104628172 A | 5/2015 |
| CN | 205151932 U | 4/2016 |
| DE | 102010053051 A1 | 6/2012 |
| EP | 2371445 A1 | 10/2011 |
| WO | 2002055182 A1 | 7/2002 |
| WO | 2012083390 A2 | 6/2012 |

OTHER PUBLICATIONS

Extended European Search Report for Application No. 17890338.1 dated Apr. 21, 2020 (10 pages).
International Search Report and Written Opinion for Application No. PCT/US2017/65882 dated Jun. 25, 2018 (14 pages).
Office Action issued by the China National Intellectual Property Administration for Application No. 201780084817.4 dated Feb. 22, 2021 (23 pages including English translation).

\* cited by examiner

WATER FILTRATION SYSTEM WITH RECIRCULATION TO REDUCE TOTAL DISSOLVED SOLIDS CREEP EFFECT

BACKGROUND

The present invention relates to systems and methods for using semi-permeable membranes to purify water. More specifically, the present disclosure is related to point-of-use, or tankless, water filtration systems that produce filtered water for immediate consumption.

Existing water filtration systems use semi-permeable membranes such as reverse osmosis (RO) membranes to remove total dissolved solids (TDS), such as salt ions and other impurities, from untreated feed water. As the feed water is filtered, concentrated waste water accumulates on an upstream side of the semi-permeable membrane and filtered water accumulates on a downstream side of the semi-permeable membrane. Both TDS and water may diffuse across the RO membrane. The diffusion rate of water across the RO membrane is a function of the osmotic pressure difference between the upstream side and the downstream side of the RO membrane. The rate at which the TDS diffuse across the RO membrane is a function of the concentration difference in TDS between the upstream side, which has a relatively high TDS concentration, and the downstream side of the RO membrane, which has a relatively low TDS concentration.

When the water filtration system is in use, a pump pressurizes the upstream side of the RO membrane, causing water to diffuse across the RO membrane and into the downstream side of the RO membrane at a water diffusion rate that is much higher than the rate at which the TDS diffuse across the RO membrane, so the effect of TDS diffusion ("TDS Creep") on the filtered water on the downstream side of the RO membrane is negligible. However, when the water filtration system is not in active production the pump is turned off, which removes the pressure differential between the upstream side and the downstream side of the RO membrane, substantially slowing the rate of water diffusion. When the pump is off, the rate of TDS creep from the upstream side of the RO membrane to the downstream side of the RO membrane is no longer negligible with respect to the rate diffusion of water across the RO membrane. Thus, TDS creep causes the concentration of TDS on the downstream side of the RO membrane to increase until either the pump is turned back on or the concentration of TDS on both sides of the RO membrane is equal. As shown in FIG. 1, the effect of TDS creep becomes more pronounced as the amount of time that has elapsed since the pump was turned off increases.

When existing water filtration systems are used after a prolonged period of idleness ("stagnation time"), the initial portion of filtered water produced by the water filtration system has a high TDS concentration as a result of the TDS creep that occurred during the idle period. As shown in FIG. 1, when the total volume of filtered water dispensed after the idle period is large, the effect of TDS creep will not be noticeable to the end-user because the portion of filtered water that has a high TDS concentration is negligible with respect to the total amount of dispensed water. Similarly, in water filtration systems that have tanks for collecting the purified water, the water filtration system will produce enough filtered water to fill the tank after the idle period. The effect of TDS creep is generally not noticeable in water filtration systems having tanks because the portion of filtered water that has a high TDS concentration is negligible with respect to the total volume of the tank. However, when existing tankless water filtration systems are used to dispense a small amount of water, for example a single glass of water, after a prolonged idle period, the TDS concentration in the filtered water dispensed by the system will be much higher than anticipated.

Existing water filtration systems include display interfaces that show information on the status of the filter and display error messages when the system is not working. Existing water filtration systems are programmed to run according to pre-set operating schedules that may not correlate well with an operator's actual demand for filtered water. For example, a water filtration system may be programmed to flush the water immediately upon entering an idle phase or after a programmed delay after the water filtration system has entered the idle phase.

SUMMARY

In one aspect, the disclosure provides a point-of-use water filtration system having an idle mode and a filtration mode, the water filtration system including a feed water inlet, a pump in fluid communication with the feed water inlet via a feed water line, and a semi-permeable membrane having an upstream, or pre-filtration, side and a downstream, or post-filtration, side. A first portion of the upstream side is in fluid communication with a membrane inlet and a second portion of the upstream side is in fluid communication with the concentrate outlet, and the downstream side is in fluid communication with a permeate outlet. The point-of-use water filtration system also includes a permeate line in fluid communication with the permeate outlet and a filtered water outlet, a concentrate line in fluid communication with the concentrate outlet, a flow path configured to selectively connect the permeate line to the feed water line; and a controller configured to anticipate demand for the filtration mode based on operator habit information stored in a memory of the controller when the water filtration system is in the idle mode and to recirculate water in the permeate line through the pump and the semi-permeable membrane in response to the anticipated demand for the filtration mode.

In another aspect, the disclosure provides a method of using a point-of-use water filtration system to filter water. The water filtration system has an idle mode and a filtration mode. The method includes the steps of: operating the water filtration system in an idle mode; anticipating a demand for filtered water based on operator habit information stored in a memory of a controller; opening a valve in a flow path between a permeate line and a feed water line; operating a pump to pump water from the permeate line through the flow path into a semi-permeable membrane; closing the valve in the flow path; operating the water filtration system in a filtration mode to supply filtered water to the operator through the permeate line.

In yet another aspect, the disclosure provides a control system for a point-of-use water filtration system having an idle mode and a filtration mode. The water filtration system further includes a pump having an inlet, a semi-permeable membrane, a permeate line, and a flow path from the permeate line to the inlet of the pump. The control system includes a processor and a memory, the processor configured to: sense operator habit information; store operator habit information in the memory; update a demand anticipation algorithm stored in the memory based on the sensed operator habit information; anticipate a demand for filtered water based on the operator habit data stored in the memory; command the valve positioned in the flow path to open in response to the anticipated increase in filtered water demand; command the pump to pump the water in the filtered water conduit through the semi-permeable membrane.

Other aspects of the invention will become apparent by consideration of the detailed description and accompanying drawings.

DETAILED DESCRIPTION OF THE DRAWINGS

Before any constructions of the disclosure are explained in detail, it is to be understood that the disclosure is not limited in its application to the details of construction and the arrangement of components set forth in the following description or illustrated in the following drawings. The disclosure is capable of other constructions and of being practiced or of being carried out in various ways.

Figure 1:
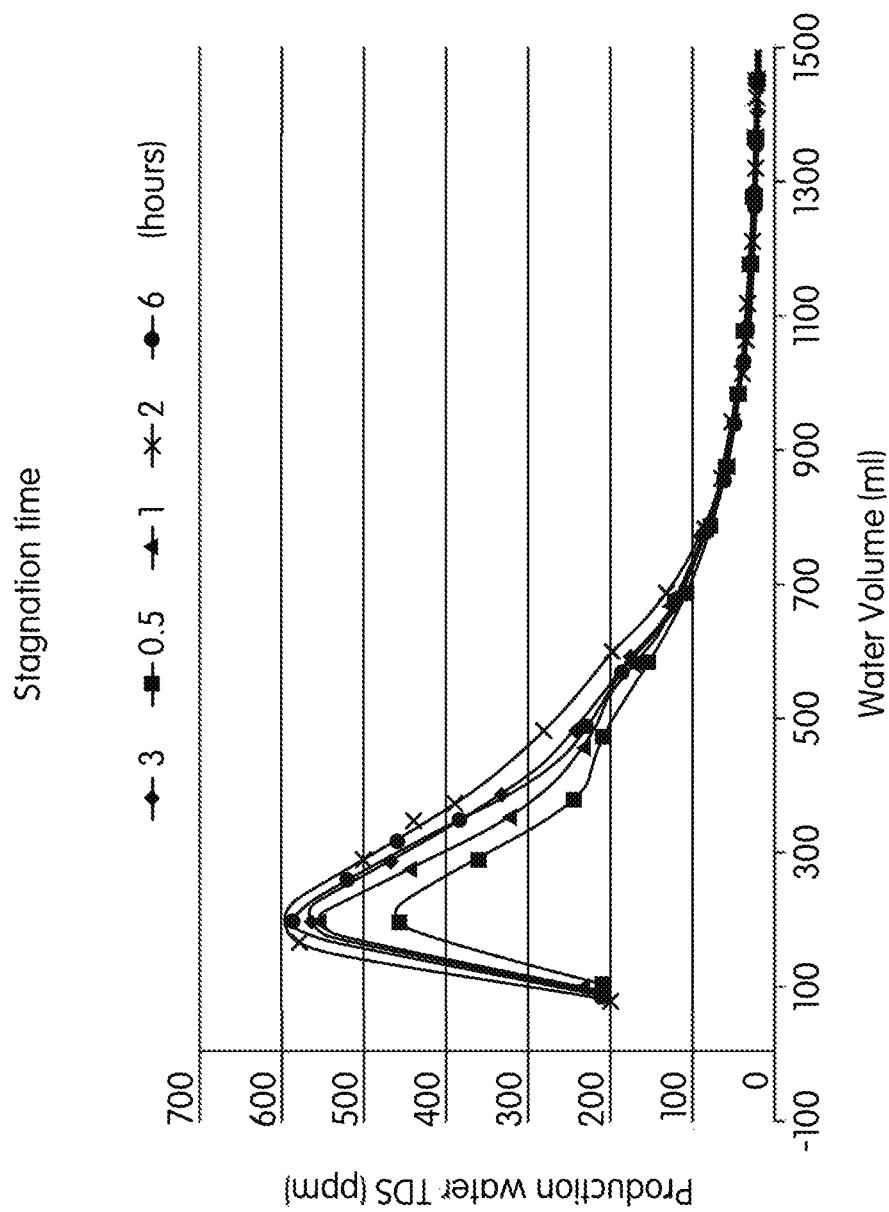
FIG. 1 is a plot of the amount of Total Dissolved Solids in production water as a function of stagnation time and as a function of water volume dispensed.
Figure 2:
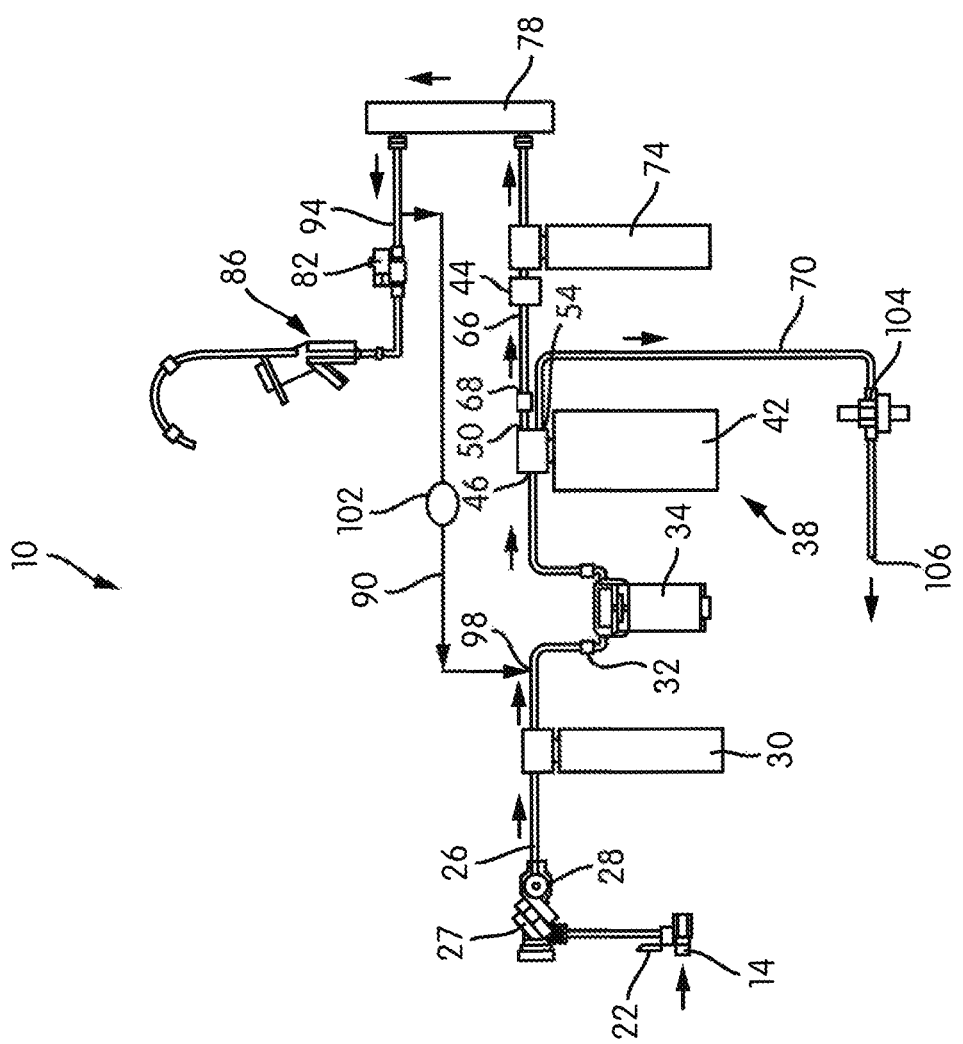
FIG. 2 is a schematic representation of a point-of-use water filtration system.

FIG. 2 shows a schematic representation of a point-of-use water filtration system 10. The point-of-use water filtration system 10 includes a raw water port 14 that is connected to a water source. A feed valve 22 is positioned along a feed water line 26 downstream of the raw water port 14 to selectively connect the point-of-use water filtration system 10 to the water source. A low pressure switch 27 is positioned along the feed water line 26. The low pressure switch 27 is adapted to prevent a pump 34 from turning on when there is no feed pressure in the feed water line 26. A feed solenoid valve 28 is positioned along the feed water line 26. The feed solenoid valve 28 is in an open position when the pump 34 is turned on and is in a closed position when the pump 34 is turned off. A composite filter 30 is connected to the feed water line 26 to remove larger impurities from the feed water before the feed water enters an inlet 32 of the pump 34. The pump 34 connects the feed water line 26 to a membrane unit 38. The membrane unit 38 includes a semi-permeable membrane 42, a feed water inlet 46, a permeate outlet 50, and a concentrate outlet 54. Feed water enters the membrane unit 38 through the feed water inlet 46 and travels along an upstream side of the semi-permeable membrane 42. Pressure provided by the pump 34 causes permeate, or filtered water, to diffuse across the semi-permeable membrane from the upstream side of the semi-permeable membrane 42 to a downstream side of the semi-permeable membrane 42. Impurities, such as salts or small dissolved solids accumulate between the feed water inlet 46 and the upstream side of the semi-permeable membrane 42. As a result, the water near the upstream side includes a relatively high concentration of impurities and may be referred to as "concentrate". A permeate line 66 is in fluid communication with the downstream side of the semi-permeable membrane 42. A sensor 68 is positioned in the permeate line 66 to sense a concentration salts or small dissolved solids in the permeate. In the illustrated construction, the sensor 68 is positioned near the permeate outlet 50. In alternate constructions, the sensor 68 may be positioned at locations along the permeate line 66. In the preferred construction, the sensor 68 is conductivity sensor, however other types of sensor may be used to sense the TDS concentration of the permeate. A wastewater line or concentrate line 70 is in fluid communication with a portion of the upstream side of the semi-permeable membrane 42 spaced from the feed water inlet 46. The concentrate line 70 is configured to receive the concentrate flowing along the upstream side of the semi-permeable membrane 42. In the illustrated construction, the semi-permeable membrane 42 is a reverse osmosis (RO) membrane. In other constructions, the semi-permeable membrane 42 may be another type of semi-permeable membrane, such as a nanofiltration membrane, an ultrafiltration membrane, or a microfiltration membrane.

The permeate line 66 includes a carbon filter 74, a UV module 78, a high pressure switch 82, and a filtered water outlet 86. The carbon filter 74 is positioned downstream of the RO membrane 42 along the permeate line 66 to improve the taste and smell of the filtered water. The UV module 78 includes a UV lamp and is positioned along the permeate line 66 downstream of the carbon filter 74 to kill microorganisms that may be in the filtered water. The high pressure switch 82 is positioned along the permeate line 66 between the UV module 78 and the filtered water outlet 86. The high pressure switch 82 is adapted to turn off the pump 34 and the UV lamp of the UV module 78 when there is not demand for filtered water. The filtered water outlet 86 is actuatable by an operator to dispense filtered water. The filtration system 10 includes an anti-microbial chemical generator (e.g. copper ion generator, silver ion generator, ozone generator, etc.) 44 to prevent biofilm formation. The anti-microbial chemical generator 44 may be placed anywhere along the permeate line 66.

A permeate recirculation line 90 communicates between the permeate line 66 and the feed water line 26. More specifically, an inlet 94 of the permeate recirculation line 90 communicates with the permeate line 66 between the UV module 78 and the high pressure switch 82, and an outlet 98 of the permeate recirculation line 90 communicates with the feed water line 26 between the composite filter 30 and the pump 34. In other constructions, the inlet 94 of the permeate recirculation line 90 may be positioned at other locations along the permeate line 66. A valve 102 is positioned along the permeate recirculation line 90 to open and close the permeate recirculation line 90 and permit or restrict, respectively, flow of recirculated water through the permeate recirculation line 90. In some constructions, the valve 102 may be a solenoid valve. In other constructions, the valve 102 may be a check valve.

The concentrate line 70 includes a solenoid valve 104 and a system concentrate outlet 106. The solenoid valve 104 modulates flow from the concentrate outlet 54 to the system concentrate outlet 106. The solenoid valve 104 may include an orifice controlled bypass. In some operational modes, such as a filtration mode, concentrate travels to the drain through the orifice. In other operational modes, such as a recirculation mode or a flush mode, the solenoid valve 104 opens to allow higher flow rates out of the water filtration system 10. The system concentrate outlet 106 may be connected to a municipal water system such as a sewer.

Figure 3:
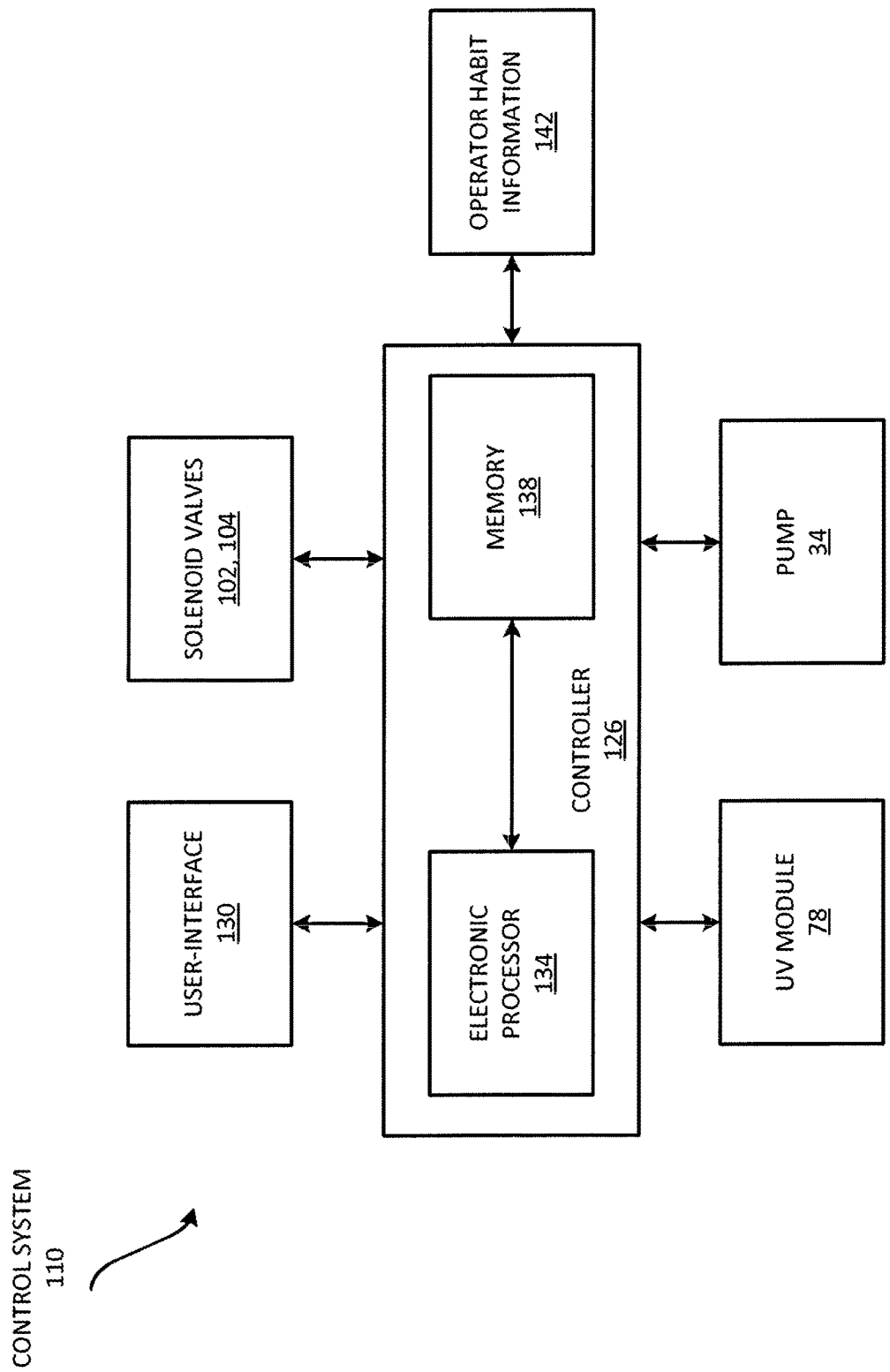
FIG. 3 is a representation of an anticipatory control system for use with a point-of-use water filtration system.
Figure 4:
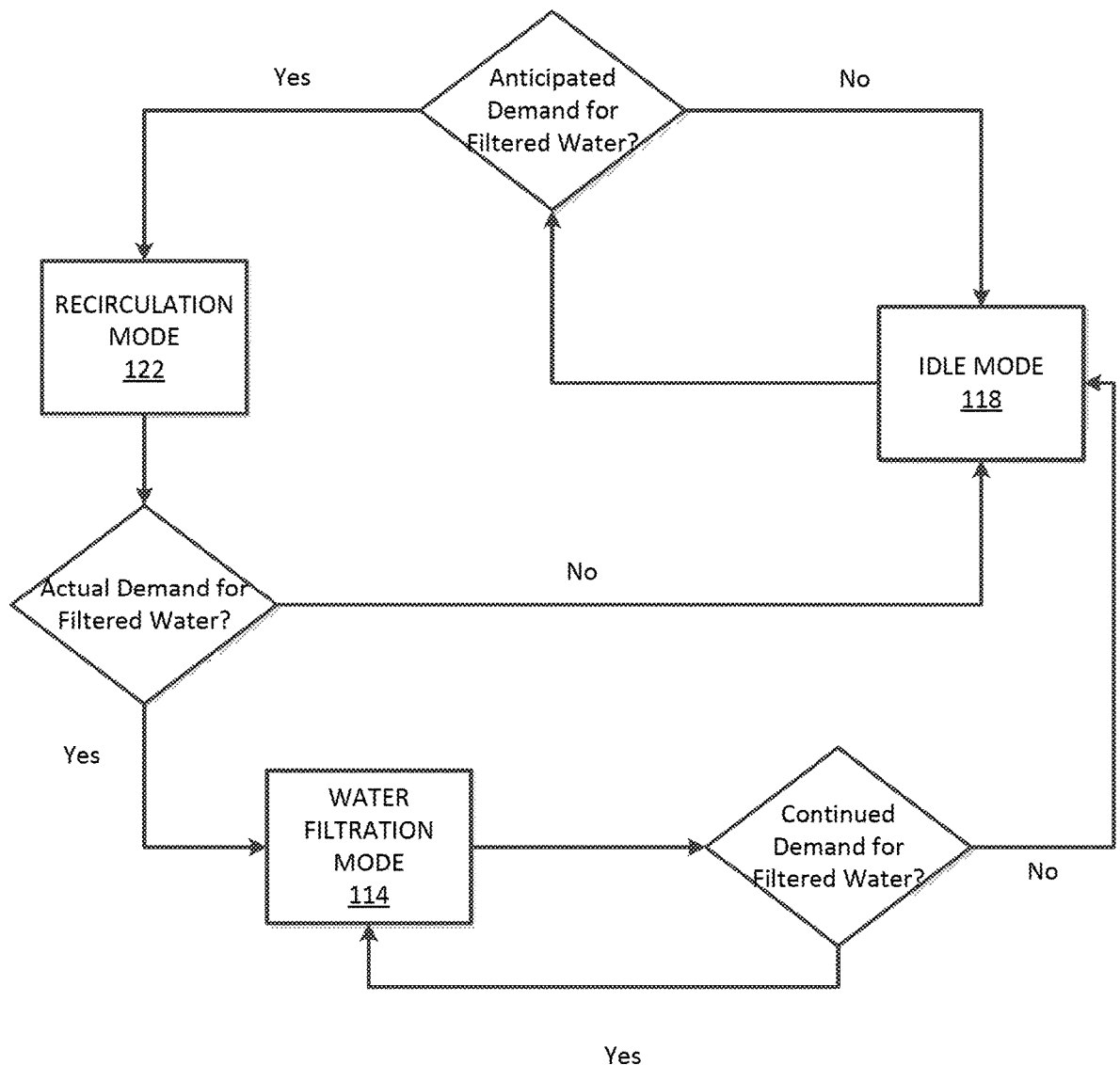
FIG. 4 is a representation of control logic used by the anticipatory control system of FIG. 3.

Referring to FIG. 3, a control system 110 is programmed to operate the water filtration system 10 in different operational modes based on an anticipated use of the water filtration system 10. The control system 110 may also monitor the water filtration system 10 and provide notifications regarding the status of the water filtration system 10 to the operator. As shown in FIG. 4, in the illustrated construction, the operational modes may include a filtration mode 114, an idle mode 118, and a recirculation mode 122. In alternative constructions, the control system 110 may operate the water filtration system 10 in other operation modes than the operation modes disclosed herein.

The control system 110 includes a controller 126 and an optional user interface 130. According to one or more exemplary constructions, the controller 126 includes a plurality of electrical and electronic components that provide power, operational control, and protection to the components and modules within the controller 126. For example, the controller 126 includes, among other things, an electronic processor 134 (e.g., a microprocessor, a microcontroller, or another suitable programmable device), and a memory 138. The controller 126 may communicate with various input and output units such as the pump 34, the valve 102 of the permeate line 66 and the permeate recirculation line 90, the solenoid valve 104 of the concentrate line 70, and the UV module 78.

The memory 138 includes, for example, a program storage area and a data storage area. In some constructions, the memory 138 may be storage space in the cloud. The program storage area and the data storage area can include combinations of different types of memory 138, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The electronic processor 134 is connected to the memory 138 and executes software instructions that are capable of being stored in RAM (e.g., during execution), ROM (e.g., on a generally permanent basis), or another non-transitory computer readable medium such as another memory or a disc. Software included in the implementation of the point-of-use water filtration system 10 can be stored in the memory 138 of the controller 126. The software includes, for example, firmware, one or more applications, program data, filters, rules, one or more program modules, and other executable instructions. The controller 126 is configured to retrieve from memory 138 and execute, among other things, instructions related to the control processes and methods described herein. In other constructions, the controller 126 includes additional, fewer, or different components.

The optional user interface 130 may be used to control or monitor the water filtration system 10. The user interface 130 includes a combination of digital and analog input or output devices required to achieve a desired level of control and monitoring for the water filtration system 10. For example, the user interface 130 includes a display (e.g., a primary display, a secondary display, etc.) and input devices such as touch-screen displays, a joystick, a plurality of knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. The user interface 130 can also be configured to display conditions or data associated with the water filtration system 10 in real-time or substantially real-time. For example, the user interface 130 is configured to display measured electrical characteristics of the water filtration system 10 and the status of the water filtration system 10. In some implementations, the user interface 130 is controlled in conjunction with the one or more indicators (e.g., LEDs, speakers, etc.) to provide visual or auditory indications of the status or condition of the water filtration system 10. The optional user interface 130 may be a smartphone running an application configured to communicate with the control system 110.

As shown in FIG. 4, the water filtration system 10 is operable in the water filtration mode 114, the idle mode 118, and the recirculation mode 122. The control system 110 is responsive to operator habit information 142 (FIG. 3) and analyzes the operator habit information 142 to command the water filtration system 10 to anticipate the operation mode desired by the operator. When the water filtration system 10 is used by the operator, the control system 110 senses operator habit information 142 based on the operator's actual use of the water filtration system 10 and stores the operator habit information 142 in the memory 138. The control system 110 is a self-programming control system 110 that constantly updates a demand anticipation algorithm based on the sensed operator habit information 142 stored in the memory 138 after each use of the water filtration system. The control system 110 then anticipates operator demand for filtered water based on the learned operator information 142 and controls the water filtration system 10 based on the unique filtered water consumption habits of the operator. Since the control system 110 is operating according to learned operator habit information 142 unique to the operator of the water filtration system 10, the control system 110 can ensure that the water filtration system 10 reliably delivers optimally filtered water (e.g. filtered water with negligible effects of TDS creep) to the operator at the exact time the operator desires filtered water. Examples of operator habit information 142 include times of the day at which filtered water is habitually demanded, periods of reduced demand for filtered water (idle periods) such as during the workday, the amount of filtered water demanded during a certain period, the flow rate of filtered water demanded during a certain period, or different water consumption habits on weekdays and on weekends. The control system 110 analyzes the operator habit information 142 to anticipate when the operator is likely to demand filtered water. The control system 110 will command the water filtration system 10 to enter the recirculation mode 122 prior to the anticipated operator demand. In some constructions, when the water filtration system 10 receives an unanticipated demand for filtered water, the water filtration system 10 will recirculate the water until a proper water quality is sensed by the control system 110. Once the proper water quality is sensed in the permeate line 66 by the sensor 68, the water filtration system 10 will dispense filtered water to the operator.

The control system 110 operates in the water filtration mode 114 when the operator has actuated the filtered water outlet 86 to dispense filtered water. In the water filtration mode 114, tap water enters the water filtration system 10 through the raw water port 14 and travels through the composite filter 30 and to the pump 34. The feed water flows into the inlet 32 of the pump 34, is pressurized by the pump 34, and is pumped to the upstream side of the RO membrane 42. The pressure generated by the pump 34 allows a large proportion of the feed water to pass through the RO membrane 42 and exit the downstream side of the RO membrane 42 into the permeate line 66. The filtered water travels through the carbon filter 74, the UV module 78, and the high pressure switch 82. When the operator opens the filtered water outlet 86 to dispense water, filtered water flows through the filtered water outlet 86.

When the operator has not actuated the filtered water outlet 86 or when the control system 110 has anticipated that the operator will not use the water filtration system 10 based on the user habit information 142 saved in the memory 138, the controller 126 commands the water filtration system 10 to enter the idle mode 118. In the idle mode 118, the pump 34 is turned off and the valve 102 of the permeate recirculation line 90 and the solenoid valve 104 of the concentrate line 70 are in the closed position. The control system 110 does not flush the upstream side of the RO membrane 42 to remove or displace the concentrate before turning off the pump 34. The anti-microbial chemical generator 44 runs, continuously or intermittently, and generates sufficient concentration of an anti-microbial chemical to prevent biofilm and bacterial growth in the permeate line 66. Since the pump 34 is off, water is not diffusing from the upstream side of the RO membrane 42 to the downstream side of the RO membrane 42. While the pump 34 is off, TDS continues diffusing from the relatively high TDS upstream side of the RO membrane 42 to the relatively low TDS downstream side of the RO membrane 42. Since TDS creep continues to occur when the pump 34 is off, the effect of TDS creep across the RO membrane 42 is no longer negligible with respect to the rate of water diffusing across the RO membrane 42. As that amount of time that has elapsed since the pump 34 was turned off ("stagnation time") increases, TDS creep causes the concentration of TDS at the downstream side of the RO membrane 42 and in the permeate line 66 to increase, becoming "high TDS permeate".

When the water filtration system is in the idle mode 118 and the control system 110 has anticipated that the operator will demand filtered water, the control system 110 commands the water filtration system 10 to enter the recirculation mode 122. In the recirculation mode 122, the controller 126 commands the feed solenoid valve 28, the valve 102 positioned in the permeate recirculation line 90, and the valve 104 in the concentrate line 70 to open. The control system 110 commands the pump 34 to pump feed water through the RO membrane 42. The newly filtered water crossing the RO membrane and entering the permeate line 66 displaces the high TDS permeate to the permeate recirculation line 90, where the high TDS permeate is then recirculated to the feed water line 26 and filtered by the RO membrane 42 to produce fresh permeate. Similarly to the idle mode, the anti-microbial chemical generator 44 runs, continuously or intermittently, and generates sufficient concentration of an anti-microbial chemical to prevent biofilm and bacterial growth in the permeate line 66 during the recirculation mode. If the operator demands filtered water as anticipated by the control system 110, the water filtration system 10 enters the water filtration mode 114. If the operator does not demand filtered water after demand has been anticipated, the water filtration system 10 enters the idle mode 118. In the preferred construction, the control system 110 runs the water filtration system 10 in the recirculation mode for thirty seconds to one minute prior to an anticipated operator demand for the water filtration system 10. In other constructions, the control system 110 may run the recirculation mode 122 for less than thirty seconds or more than one minute. In other constructions, the control system 110 may instead run the recirculation mode 122 until a sensed TDS concentration in the permeate line 66 has decreased to an acceptable level. In some constructions, when in the recirculation mode 122, the control system 110 may turn on the UV module 78 to allow the UV lamp within the UV module 78 to warm up before the control system 110 commands the water filtration system 10 to enter the water filtration mode 114.

Figure 5:
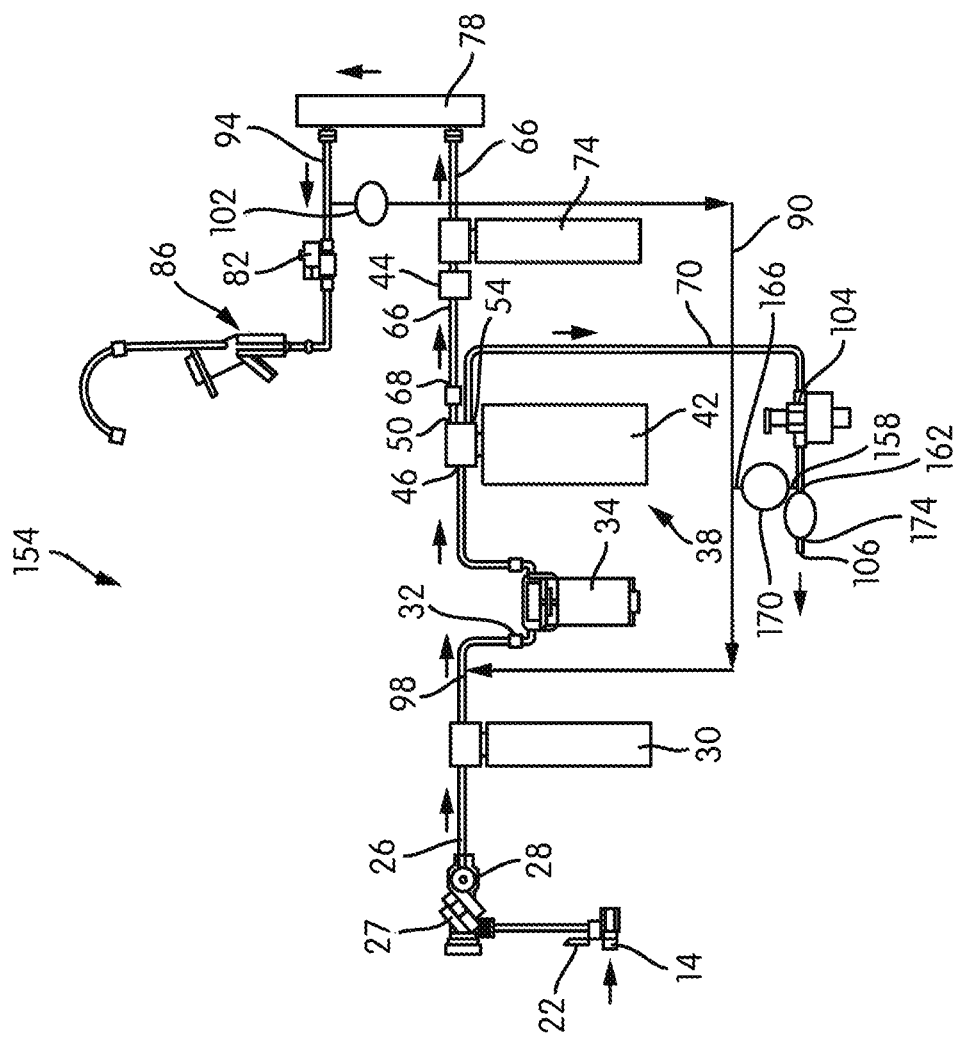
FIG. 5 is a schematic representation of another construction of a point-of-use water filtration system.

FIG. 5 shows a schematic representation of a point-of-use, water filtration system 154 according to an alternative construction. The construction of FIG. 5 is substantially similar to the construction of FIG. 2, so like reference numerals will be used to refer to like parts. The water filtration system 154 includes a raw water port 14 connected to a water source. A feed valve 22 is positioned along a feed water line 26 downstream of the raw water port 14 to selectively connect the water filtration system 154 to the water source. A low pressure switch 27 is positioned along the feed water line 26. The low pressure switch 27 is adapted to prevent a pump 34 from turning on when there is no feed pressure in the feed water line 26. A feed solenoid valve 28 is positioned along the feed water line 26. The feed solenoid valve 28 is in an open position when the pump 34 is on and is in a closed position when the pump 34 is turned off. A composite filter 30 is connected to the feed water line 26 to remove larger impurities from the feed water before the feed water enters an inlet 32 of the pump 34. The pump 34 pressurizes the feed water before the feed water enters the membrane unit 38. The membrane unit 38 includes a reverse osmosis (RO) membrane 42, a feed water inlet 46, a permeate outlet 50, and a concentrate outlet 54. The RO membrane 42 includes an upstream side and a downstream side. The RO membrane 42 is substantially similar to the RO membrane 42 described in detail above. A permeate line 66 is in fluid communication with the downstream side of the RO membrane 42. A concentrate line 70 is in fluid communication with the upstream side of the RO membrane 42.

The permeate line 66 includes a carbon filter 74, a UV module 78, a high pressure switch 82, and a filtered water outlet 86. The carbon filter 74 is positioned downstream of the RO membrane 42 along the permeate line 66. The UV module 78 is positioned along the permeate line 66 downstream of the carbon filter 74. The high pressure switch 82 is positioned along the permeate line 66 between the UV module 78 and the filtered water outlet 86. The filtered water outlet 86 is actuatable by the operator to dispense filtered water. Similarly as in FIG. 2, the anti-microbial chemical generator 44 may be placed anywhere along the permeate line 66.

A permeate recirculation line 90 selectively connects the permeate line 66 to the pump 34. As shown in the construction of FIG. 5, an inlet 94 of the permeate recirculation line 90 is positioned downstream of the UV module 78. An outlet 98 of the permeate recirculation line 90 is connected to the feed water line 26. In other constructions, the inlet 94 of the permeate recirculation line 90 may be positioned at other locations along the permeate line 66. A valve 102 is positioned along the permeate recirculation line 90 to selectively connect the permeate line 66 to the feed water line 26. In some constructions, the valve 102 may be a solenoid valve. In alternate constructions, the valve 102 may be check valve.

The concentrate line 70 includes a solenoid valve 104 and a system concentrate outlet 106. The solenoid valve 104 selectively connects the concentrate outlet 54 of the RO membrane 42 to the system concentrate outlet 106. The solenoid valve 104 may include an orifice controlled bypass. In some operational modes, such as a filtration mode, concentrate travels to the drain through the orifice. In other operational modes, such as a recirculation mode or a flush mode, the solenoid valve 104 opens to allow higher flow rates out of the water filtration system 10. During the flush mode, the anti-microbial chemicals generated by the anti-microbial chemical generator 44 will be flushed out of the filtration system 10. The system concentrate outlet 106 may be connected to a municipal water system such as a sewer.

A concentrate recirculation line 158 selectively connects the concentrate line 70 to the permeate recirculation line 90. As shown in FIG. 5, the concentrate recirculation line 158 is in fluid communication with the feed water line 26 via the permeate recirculation line 90. An inlet 162 of the concentrate recirculation line 158 is positioned between the solenoid valve 104 of the concentrate line 70 and the system concentrate outlet 106. An outlet 166 of the concentrate recirculation line 158 is in fluid communication with the permeate recirculation line 90. A valve 170 selectively connects the concentrate line 70 to the concentrate recirculation line 158. A valve 174 is positioned along the concentrate line 70 downstream of the concentrate recirculation line inlet 162 and upstream of the system concentrate outlet 106. In some constructions, the valves 170, 174 may be solenoid valves. In alternative constructions, the valves 170, 174 may be check valves.

The water filtration system 154 can use the same control system 110 discussed above with the control system 110 modified to include logic to engage the concentrate recirculation line 158. Accordingly, the filtration mode 114 and the idle mode 118 are substantially the same as described above for the water filtration system 10. The recirculation mode 122 is modified to include logic to engage the concentrate recirculation line 158 as described below. In alternative constructions, the control system 110 may operate the water filtration system 154 in other operational modes than the operational modes disclosed herein.

As described above with respect to the control system 110, when the water filtration system 154 is in the idle mode 118 and the control system 110 has anticipated that the operator will demand filtered water, the control system 110 commands the water filtration system 154 to enter the recirculation mode 122. When in the recirculation mode 122, the controller 126 commands the valve 102 positioned in the permeate recirculation line 90 to open. The controller 126 commands the valve 170 positioned in the concentrate recirculation line 158 and the valve 174 positioned in the concentrate line 70 to open to predetermined amounts corresponding to a calculated amount of concentrate recirculation flow. Since the filtered water outlet 86 is in the closed position, the high pressure switch 82 is also closed. The control system 110 commands the pump 34 to pump feed water through the RO membrane 42. The newly filtered water crossing the RO membrane displaces the filtered water that was in the permeate line 66 during the idle period and was therefore exposed to TDS creep ("high TDS permeate"). The high TDS permeate from the permeate line 66 travels to the permeate recirculation line 90 and is combined with concentrate from the concentrate recirculation line 158. The combined flow of high TDS permeate and concentrate flows to the feed water line 26 and is filtered by the RO membrane 42 to produce fresh permeate. In the preferred construction, the control system 110 runs the water filtration system in the flush mode for thirty seconds to one minute prior to an anticipated use of the water filtration system 154. In other constructions, the control system 110 may run the flush mode for less than thirty seconds or more than one minute. In other constructions, the control system may instead run the recirculation mode 122 until a sensed TDS concentration in the permeate line 66 has decreased to an acceptable level.

In some constructions, when in the recirculation mode 122, the control system 110 may provide power to the UV module 78 to allow the UV module 78 to warm up before the control system 110 commands the water filtration system 154 to enter the water filtration mode 114.

Various features and advantages of the disclosure are set forth in the following claims.

What is claimed is:

1. A point-of-use water filtration system having an idle mode and a filtration mode, the water filtration system comprising:
   a feed water inlet;
   a pump in fluid communication with the feed water inlet via a feed water line;
   a semi-permeable membrane having an upstream side and a downstream side, a first portion of the upstream side in fluid communication with a membrane inlet and a second portion of the upstream side in fluid communication with the concentrate outlet, and the downstream side in communication with a permeate outlet;
   a permeate line in fluid communication with the permeate outlet and a filtered water outlet;
   a concentrate line in fluid communication with the concentrate outlet;
   a flow path configured to selectively connect the permeate line to the feed water line; and
   a controller configured to anticipate demand for the filtration mode based on operator habit information stored in a memory of the controller when the water filtration system is in the idle mode and to recirculate water in the permeate line through the pump and the semi-permeable membrane in response to the anticipated demand for the filtration mode.

2. The water filtration system of claim 1, wherein the controller is not configured to flush the upstream side of the semi-permeable membrane before commanding the water filtration system to enter the idle mode.

3. The water filtration system of claim 1, wherein the semi-permeable membrane is a reverse osmosis membrane or a nanofiltration membrane.

4. The water filtration system of claim 1, wherein the flow path includes a valve selectively actuatable by the controller.

5. The water filtration system of claim 1, wherein the controller is configured to detect and to write operator habit information to the memory and anticipate demand for the filtration mode based on the operator habit information written to the memory.

6. The water filtration system of claim 1, wherein the controller is configured to command the water filtration system to operate in the filtration mode after at least a portion of the water in the permeate line has been recirculated through the semi-permeable membrane.

7. The water filtration system of claim 1, wherein the flow path is a first flow path and further comprising a second flow path positioned between the concentrate line and the first flow path, the second flow path including a valve selectively actuatable by the controller.

8. The water filtration system of claim 7, wherein the water flowing into the feed water line is a combination of permeate and concentrate.

9. The water filtration system of claim 1, wherein the permeate line further includes an anti-microbial chemical generator configured to generate an anti-microbial chemical.

* * * * *